Dec. 20, 1938.  B. W. FREEMAN  2,140,697
ORNAMENTING MACHINE
Original Filed Nov. 25, 1936  3 Sheets-Sheet 1

Inventor
Benjamin W. Freeman
By Riordon & Riordon
Attorney

Dec. 20, 1938.  B. W. FREEMAN  2,140,697
ORNAMENTING MACHINE
Original Filed Nov. 25, 1936   3 Sheets-Sheet 2

Inventor
Benjamin W. Freeman
By Riordan & Riordan
Attorneys

Dec. 20, 1938.   B. W. FREEMAN   2,140,697
ORNAMENTING MACHINE
Original Filed Nov. 25, 1936   3 Sheets-Sheet 3

Inventor
Benjamin W. Freeman

By Riordan & Riordan
Attorneys

Patented Dec. 20, 1938

2,140,697

UNITED STATES PATENT OFFICE 2,140,697

ORNAMENTING MACHINE

Benjamin W. Freeman, Cincinnati, Ohio

Application November 25, 1936, Serial No. 112,777
Renewed February 7, 1938

51 Claims. (Cl. 101—316)

This invention relates to machines for use in the manufacture of boots and shoes, and more particularly to combined marking and cutting machines adapted for operations upon skins, flat upper blanks, fitted or closed uppers, and the like, in which the work is marked with ink, pigment, or its equivalent at the same time, or as a part of its cycle of operations during which the work is also ornamented by perforating or cutting out a design therein.

Such machines are broadly old, and as illustrative of types of machine in which such work is accomplished, reference may be made to the reissue patents, Nos. Re. 20,177 to Benjamin W. Freeman, dated November 17, 1936 and Re. 20,294 to Benjamin W. Freeman et al., dated March 16, 1937. In the former of these two patents, the work is placed on a slidable table or carriage by reference to gages thereon, and is moved laterally with the carriage to a position beneath a reciprocating plunger, which carries an ornamenting die. A suitable reaction member may be located in alignment with the plunger such that when the work has been moved laterally, a relative movement between the die and the work will effect an ornamentation after which the work may be replaced.

After an ornamenting operation, the work is stripped or removed from the cutters of the die by a stripping plate, which in said embodiment, carries marking elements which provide inking surfaces for ink-marking the work as the cutters perforate the work.

In the latter of said patents the work is mounted on the top of a reciprocating plunger and the die partakes of a lateral movement with respect to the work, until the work and die are aligned, whereupon relative vertical movement between the work supporting plunger and die will accomplish the ornamentation. In this type of machine, however, the marking plate, while mounted resiliently, is provided with springs which are in themselves insufficient to effect a stripping of the work, such springs as are used being merely of sufficient strength to normally position the marking edges in advance of the cutting edges so that they may be properly inked, and the stripper pressures are applied to this plate through a separate mechanism mounted in the head of the machine member. This mechanism is effective to apply very heavy pressures and hence is generally utilized in a machine of the heavier nature, and somewhat more complicated than the type of my first mentioned patent.

In both types of machine the marking element of the die is automatically inked during the relative lateral movements between the work support and the dies, and both machines are provided with safety mechanism including control mechanism for a main clutch which is designed to connect the movable plunger of the machine to a suitable source of power, the idea being to prevent injury to the work or to the operator by inadvertent operation of the machine.

It is a primary object of the instant invention to provide a machine which accomplishes the objects and major features of the several types of combined cutting and marking machines known to the art, and to attain the advantages of both types of machines, while retaining the simplicity and inexpensiveness of the simpler form of machine illustrated in the earlier patent.

Among the objects of this invention is the elimination of substantially all stripping mechanism, including plates, springs, etc., from the die unit of the machine, thus permitting manufacture of dies at less cost than heretofore, and making the machine more universal in its uses and operation.

Another object is to provide means to strip the work from the die by mechanism other than the conventional type of stripper plate and stripper pressure means heretofore conventionally used, in a mechanism which is independent of and separate from the die units.

Separation of the stripping means from the die is advantageous in that it eliminates stripping pressures from the marking devices of the die.

A still further object is directed to a work supporting arrangement, wherein a single means combines the functions of supporting the work, gaging same for accurate positioning in the machine, and stripping the work from the die.

Another and very important object contemplates a stripper means which is positive in its action and not dependent upon springs for its operation.

Still another object contemplates means for securing the die in the machine firmly, against dislodgement or any tendency toward movement when the work is being stripped from the die, rather than placing same freely in the base of the machine, on guide pins, or in the head of the machine as heretofore. Inasmuch as the work will be stripped by means substantially independent of and separate from the die units, this act of stripping will exert a pull on the die, which will vary in accordance with the type of work, size and number of tubes or cutting members, etc. At the same time it is desirable that the means for securing the die in position will be of such a nature as to permit ready replacement of a die by an operator. To this end a clamping arrangement is provided wherein the die may be securely locked in position and positively held against axial movement but which will permit, when properly manipulated by an operator, ready movement of the die into and out of the machine.

It is a further object to provide a marking device which may be mounted upon the perforating or cutting die, and readily detached therefrom, or which may be mounted per se, or which may be associated in any convenient manner with the perforating die.

All of the major objects and advantages of the aforesaid patents are contemplated herein, and the disclosures of such patents are to be regarded as disclosures herein.

The present invention has for another object to provide a control device which prevents an operator from treadling or otherwise initiating operation of the machine until the work is in exact alignment with the die.

To the attainment of the above and other objects which will appear as the description proceeds, reference may be made to the accompanying drawings, in which:—

Figure 1:
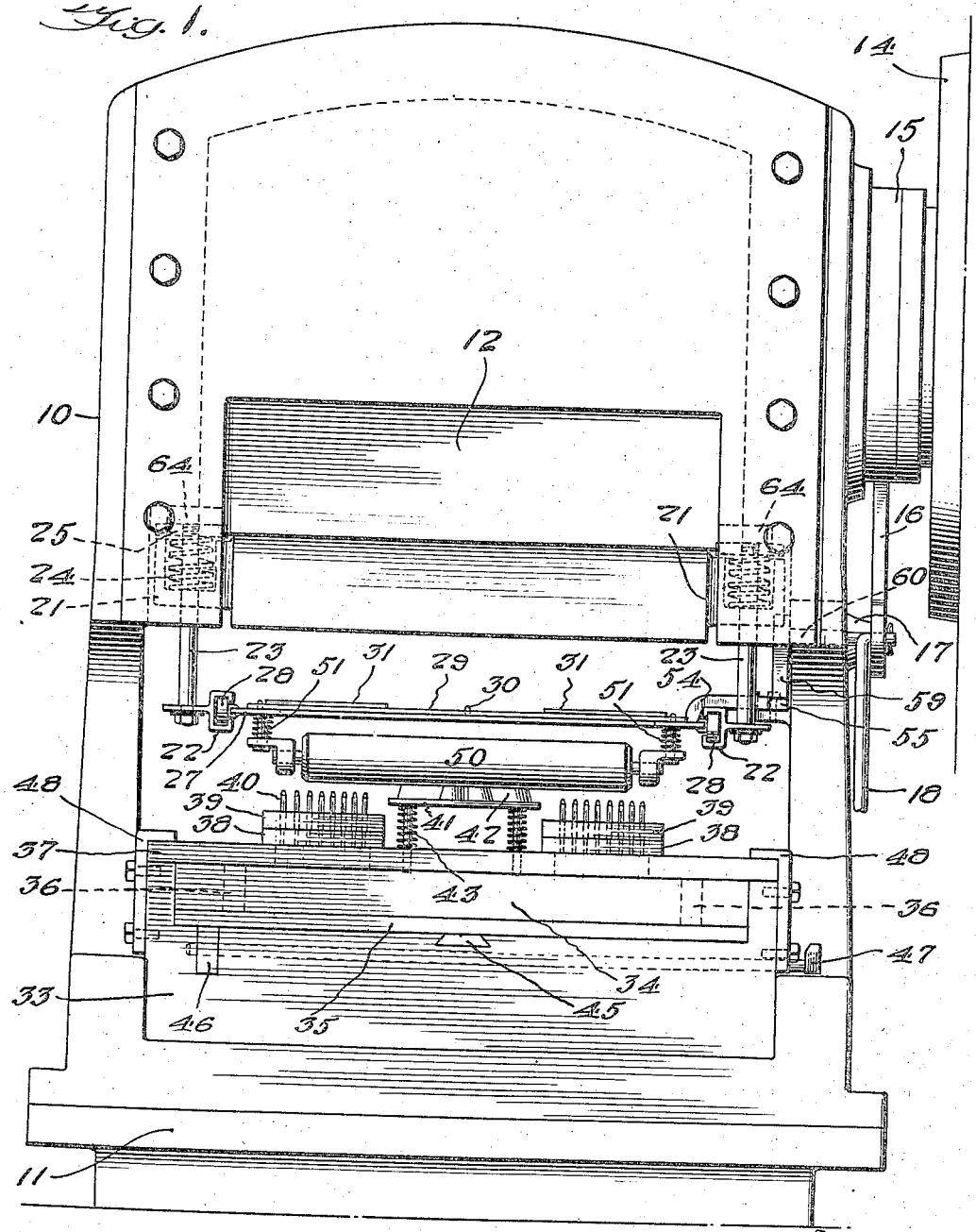
Fig. 1 is a front elevation of the machine as an operator would view it.

Referring now more specifically to the drawings in which like reference numerals designate like parts, there will be found a main frame or housing 10 which may be mounted upon a suitable stand or base 11. A plunger 12 reciprocates in the head of the frame 10, being driven by suitable mechanism (not shown) from a power shaft 13, upon which is mounted for free rotation, a driving pulley 14. Operatively interposed between the pulley 14 and the shaft 13 is a clutch mechanism 15, which mechanism is designed to connect the pulley 14 to the shaft 13, under the influence of a clutch lever 16, pivoted at 17, to the side of the frame or housing 10. The clutch lever 16 is in the general form of a bell crank having its lower arm pivotally connected to a treadle link 18, which extends to any point convenient to an operator, for connection to a knee or foot treadle.

The clutch mechanism is generally conventional in nature, and illustrations thereof will be found in my prior patents, above mentioned, to which reference may be made for a more complete description. Suffice to say, it is of the single revolution type, such that when the treadle link 18 is actuated, the lever 16 will release the clutch, and connect the pulley 14 to the shaft 13, to actuate same through a single complete revolution. It will be understood, of course, that the pulley 14 is constantly driven.

At either side of the plunger 12 will be found lugs 21, from which a pair of tracks or guides 22 may be supported, at the sides of the plunger. To this end, depending struts or posts 23 will be mounted in the respective lugs 21 for reciprocating movement therethrough, and springs 24 encircle the upper ends of the posts, these springs being seated in sockets of the lugs 21. Each post 23 will terminate in a collar 25 adjustably threaded or otherwise secured to its post, and the compression of the springs 24 between the collars 25 and the lugs 21 will normally tend to urge the tracks toward the lower face of the plunger. The size and length of the springs is such that when the plunger descends, the clearance between the lower face thereof and the carriage 27 on the tracks 22 will be taken up, but it will be understood that the strength of the springs need be merely sufficient for these functions, and they need not be used for stripping.

The walls of the sockets or lugs 21 and the collar 25 are arranged so that when the plunger rises they will engage each other and a positive pull placed on the posts 23, for stripping purposes hereinafter described.

The frame 10 is suitably shaped or recessed to accommodate the lugs 21 and mechanism supported thereby, and the tracks 22, while movable vertically with the plunger and movable vertically relative to the plunger, will partake of no lateral movement at all.

A table or carriage 27 is mounted for lateral reciprocatory or sliding movement in the guides or tracks 22, rollers 28 being provided for the purpose. In the present embodiment the rollers are illustrated as mounted on the work carriage, but obviously the reverse thereof is a full equivalent and the rollers could be mounted in the guides 22 with the carriage slidable thereon. This carriage 27 may take the form of a hollow rectangle, or may be made U-shaped, and is designed to carry a combined work positioning, supporting and stripper plate 29. Pins 30 may be located at suitable intervals on the carriage 27 to cooperate with mating openings in the plate 29 to insure accurate positioning of the plate on the carriage 27.

The plate 29 not only supports the work but positions and locates the work accurately with respect to the dies and pressure applying plunger of the machine and, to this end, is provided with gages cooperative with the work. These gages may be any conventional form such as spring pressed pins, adjustable fingers or abutments cooperative with a fixed portion of the work. In the present instance they are illustrated as edge gages or abutments 31, substantially equal in thickness, to the thickness of the work, and shaped to conform to some predetermined characteristic of the work, e. g., a shaped edge of an upper blank.

The base of the frame 10 carries a die holder 33 which may be built into the frame or detachably secured thereto as desired. This die holder is designed to receive and detachably mount an ornamenting die generally indicated at 34, which die comprises a base plate 35 which, by means of struts 36, supports a die block 37. Tube plates 39 and sub plates 38 are mounted upon the die block, the tube plate carrying perforating tubes or cutting elements 40.

The sub plate 38 and block 37 of the die unit will be suitably perforated beneath the tubes to permit exit of chips or cuttings from the work, into the chamber or cavity between the block 37 and base plate 35. The provision of this chamber or cavity is a decided advantage, in the handling of the chips, particularly where the die is held in a fixed position in the bed of the machine.

With a sliding die, chips offer no problem, since each movement of the die sweeps the chips away. A fixed die, however, necessitates some means of handling the cuttings, and usually the machine bed is cut out or perforated for the exit of such cuttings. All of this can be eliminated by using a die constructed with a chip receiving cavity or space, as described.

Figure 2:
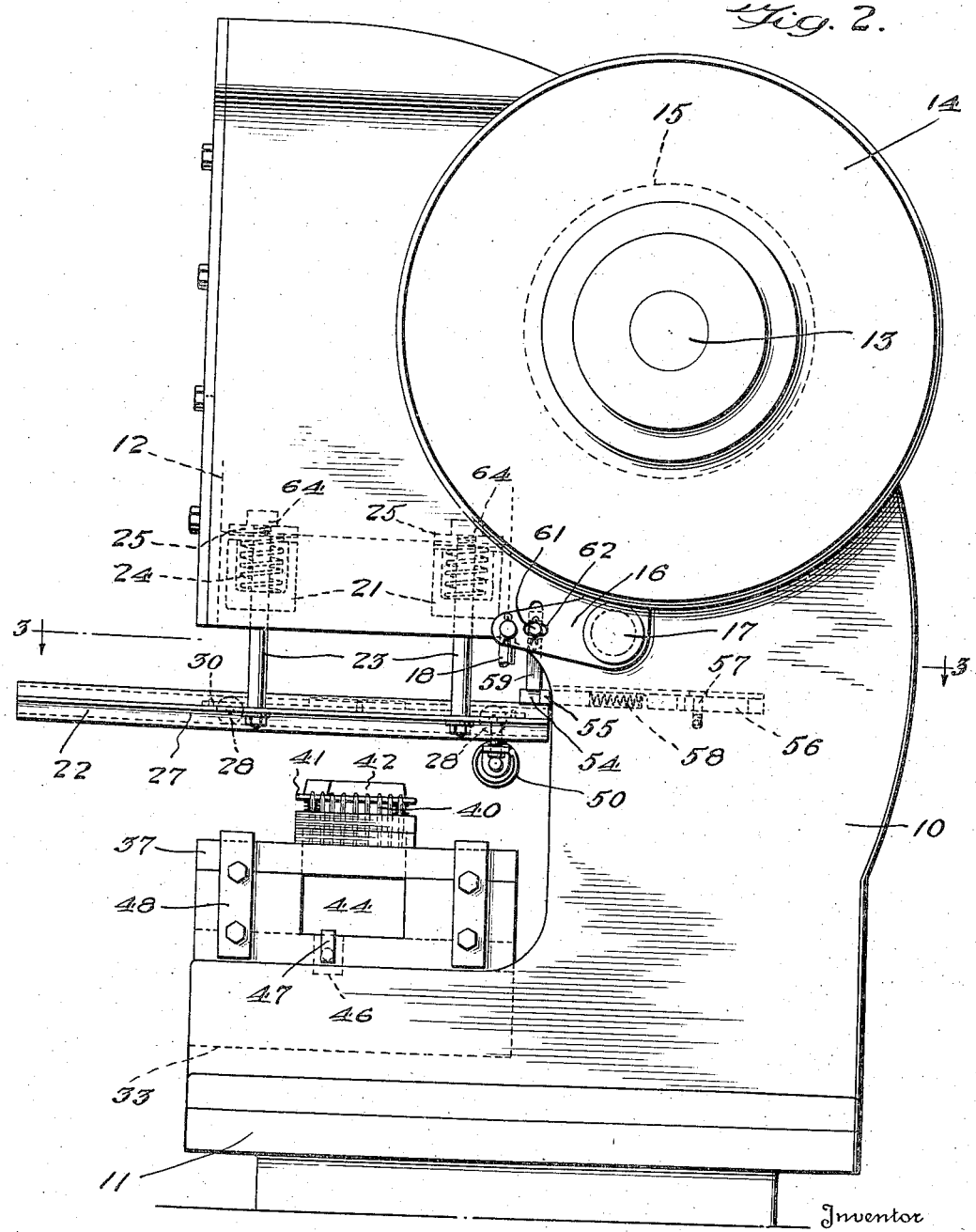
Fig. 2 is a side elevation thereof.
Figure 3:
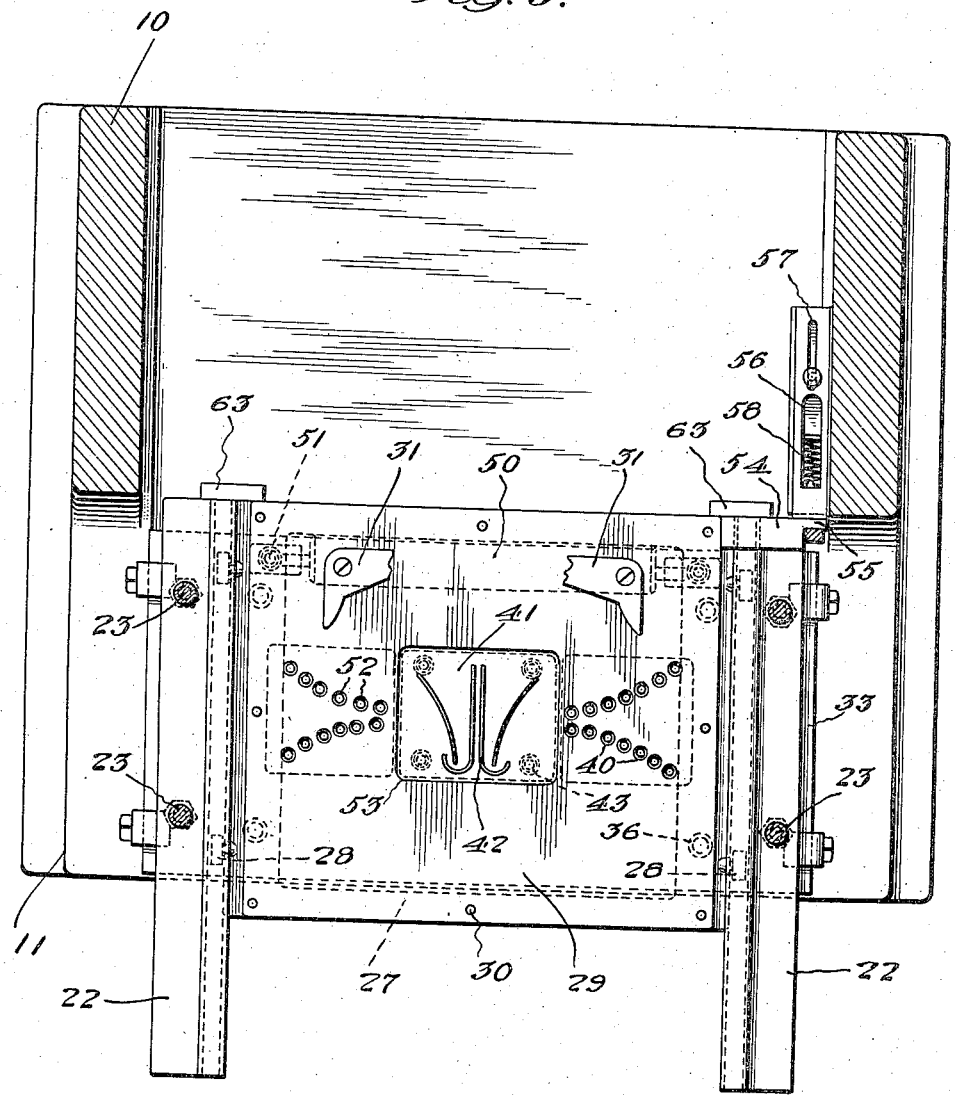
Fig. 3 is a plan view, partly in section, on line 3—3 of Fig. 2.
Figure 4:
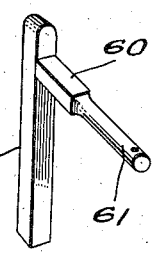
Figs. 4 and 5 are perspectives of machine details.
Figure 5:
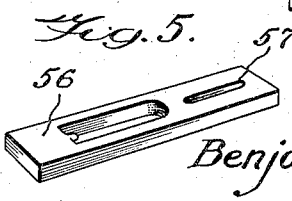

Preferably, though not necessarily, this space will be enclosed between the block 37 and base plate 35 except for openings at the end of the die unit, indicated in Fig. 2 at 44, such that these cuttings or chips can escape at the ends of the die only.

A marking plate 41 carrying marking edges or ribs 42, is also mounted upon the die blocks 37. In the herein described embodiment, the plate 41 being resiliently supported by spring encircled pins 43. Preferably the strength of the springs will be merely sufficient to carry the plate 41 with the marking edges 42 extended or advanced beyond the cutting surfaces of the tubes or cutters 40.

While the marking section of the die is disclosed herein as unitary with two cutting sections, this is but illustrative, as each section might readily be separate, and any section might be eliminated, according to the ornamental pattern desired.

To facilitate accurate positioning of the die in the die holder, a dove-tail 45 may be provided, and a perforated ear or lug 46 may also be provided to cooperate with a latching pin 47, whereupon the die may be locked in an accurate location, in a manner similar to that described in my aforementioned patents. This latching pin may be arranged to cooperate with the driving mechanism of the machine, to prevent ill-timed operation thereof, as described in Patent No. 2,047,198, or may be used merely as a spring-pressed plunger designed to lock the die in its proper place.

Holding lugs 48, beneath which the die block may slide laterally, are provided to insure that the die does not in any manner move vertically with respect to the die holder 33, or in any manner tend to pull out of the base of the machine. This is necessary because of the drag or lift applied to the die in stripping work therefrom, as hereinafter described.

While the die may slide laterally, beneath the lugs 48, nevertheless they will be locked against such lateral movement during normal operation by the latching mechanism 46—47. Of course there is no strain laterally which is at all comparable to the drag or lift which occurs during stripping in the present arrangement.

An ink applying mechanism, comprising an inking roller 50, is mounted on the work carriage 27 in such position that when the carriage is moved outwardly from the machine, for the placement of work thereon, the roller will lightly contact the surfaces of the marking edges 42, to apply ink thereto. The roll 50 is resiliently mounted by means of adjustable spring encircled pins 51, and this is effective to cause an even distribution of ink on the marking surfaces of the ribs or edges 42, each time that the carriage 27 is pulled out for removal and placement of work, and thereafter pushed in beneath the plunger, and over the die.

The ink roll 50 is shown as depending beneath the carriage 27, and enough clearance is provided to permit passage of the roll, such that it but lightly contacts the ribs 42. Should it be desired to shorten the length of stroke of the plunger 12, with attendant reduction in the permissible clearance between the lower surface of the carriage 27 and the ribs 42, then the roll 50 might readily be positioned at the rear edge of the carriage, with just a sufficient portion of the roll projecting below the carriage to be effective.

From the foregoing, it will be clear that the die is on one side of the work carriage 27 and work plate 29, and that the plunger 12 which is on the other side, effects a relative movement between the work and the die, just as illustrated in the above mentioned patents. That is, the gauge plate is interposed between the plunger and the die. It follows from this, that the plate 29 must be suitably designed to permit passage of the marking edges 42 and the cutting elements 40 therethrough, to engage the work. Hence the plate 29 is perforated as at 52, to accommodate the cutting elements. The marking plate 41 is accommodated by an opening 53, illustrated herein as corresponding to the entire shape and size of the plate 41, but if found desirable, instead of one large opening 53, the plate 29 might be so cut out as to accommodate only the ribs 42, i. e., it may be slotted for each rib instead of being provided with a single large opening 53. The design, arrangement and sizes of the die elements (both cutting and marking) will control the shape, size and style of openings in the plate 29.

The work is located on the carriage 27 by reference to the gages 31, on plate 29, while at a point remote from the die and hence it is essential that the carriage 27 be accurately located relative to the die before an ornamenting operation is attempted. To this end, the carriage 27 is provided with an offset arm 54, projecting laterally at one side of the carriage. The end of the arm 54 is cut away to form a narrow projecting finger 55.

A spring pressed slide 56, controlled by a pin and slot 57, and normally urged forwardly or toward the carriage 27 by a spring 58, is slidingly mounted in a suitable boss or slot in the frame of the machine. The end of the slide 56 is so positioned as to engage the finger 55 when the carriage 27 approaches its innermost position.

A pin 59 is mounted for vertical movement within the frame 10, and this pin has a flat sided, offset arm 60 extending through a slot in the frame wall, the arm 60 terminating in a rounded end portion 61 at the outside of the frame. The clutch lever 16 is slotted, as at 62, for pivotal connection with the end 61. The location of the pin 59 is such that its lower end normally rests upon the upper surface of the slide 56, when the latter is in its outer position, whereupon the lever 16 is restrained from clutch releasing movement, in fact, the machine cannot be treadled. When, however, the carriage 27 is pushed rearwardly, the finger 55 will engage the slide, to push same inwardly from beneath the pin 59, and the pin will then, in turn, first rest upon the finger 55 until the carriage is in its absolute innermost position, and thereafter hang in space forwardly of the finger 55. At this time the machine may be treadled, since the slide 56 and finger 55 will be out of the way. Any convenient means of determining the innermost limit of movement for the carriage may be utilized, stops 63 at the ends of the track 22 being an exemplary means.

An important feature of the machine, noted above, is the fact that by the relative lateral movement of the work support and dies, inking of the die is effected automatically, and this makes it essential that the ink applying roller 50 be located in a properly adjusted and spaced position relative to the plane of the marking edges 42, before the carriage is moved across the die.

The plunger, supporting the carriage and ink roll, may come to rest, however, in varied positions due to its own inertia, and accordingly means are provided herein to insure accurate positioning of the carriage 27 and roll 50 with respect to the die, regardless of the position of rest attained by the plunger. Such means comprise stops 64 built into the frame 10 in position to engage the collars 25, or the uppermost ends of the posts 23. Since the springs 24 are positioned between the lugs 21 on the plunger and the collar 25, it will be evident that regardless of the position of the plunger, the collar will always be maintained against the stops 64 and hence the position of the ink roll with respect to the marking plate 41 and its edges 42 will be the same, whenever the plunger is in its normal inoperative position. The collars 25, being adjustable, offer a facile means of adjusting the location of the table 27 and ink roll 50.

From the foregoing, the operation of the machine may be readily ascertained. Work is placed upon the plate 29 and by reference to the gages 31 accurately located, this placement being effected while the slide or carriage is in its outermost position. As the carriage is pushed inwardly, the roller 50 which has applied ink to the marking edges 42 will repeat the performance or means may be provided to ink in one direction only, in a manner similar to the disclosures of my prior patents. Until the carriage is in its innermost position, the machine cannot be treadled. Once the lever 16 is released by the finger 55 the machine may be treadled, whereupon the plunger will descend, carrying with it the carriage 27. The springs 24 will first move the carriage 27 relative to the plunger until clearance therebetween is taken up, and then the plunger and carriage, moving together, force the work down against the dies to effect the ornamenting operation.

The plunger then ascends, whereupon a positive pull is exerted upon the work and work support as the lugs 21 engage the collars 25.

The work is mounted on the upper face of the plate 29, and the work support, including the plate 29, strips the work from the dies during the return movement of the plunger 12. Hence no stripping mechanism is necessary as a part of the dies. The plate 29, having combined functions, will be made of a material most suitable for the stripping function. The lugs 48 hold the die against any lift or tendency toward being raised as the work is stripped from the tubes 40. It will be recalled that the die is restrained from lateral movement by the latch 46—47, and wedge 45. Of course for replacing dies it is normally necessary to release the latch 46—47 and slide the die from beneath the restraining lugs 48.

In other words, the present invention provides a single plate which not only supports the work independently of the dies, but positively strips the work independently of the die, without the action of springs or other resilient means heretofore thought necessary.

When the machine is treadled the pin 59 will of course be carried downwardly by the lever 16, to a position immediately in advance of the finger 55. This will prevent any movement of the carriage 27 forwardly or outwardly of the machine, and as the stops 63 prevent further inward movement it will be evident that the carriage is locked in position.

It will be understood that a suitable backing medium such as the backing paper now conventionally used may be placed in the present machine in such manner as to extend across the lower face of the plunger.

It will be further understood that the embodiment of the invention herein described is intended as illustrative, and not as limiting.

Having thus described my invention, what I claim as new and desire to secure by Letters Patent of the United States is:—

1. A machine for ornamenting shoe parts comprising a die support, a marking die and a cutting die, means to apply ink to said marking die, a combined work supporting and stripping means movably mounted independently of said dies, pressure applying means operatively connected to said combined means to effect relative movements between said dies and said combined means whereby to ornament a work piece on said combined means and to strip the work piece from the cutting die after ornamentation thereof, and means to secure said dies against movement relative to said die support, when the work piece is stripped from the cutting die.

2. A machine for ornamenting shoe parts comprising a die support, a marking die and a cutting die, means to apply ink to said marking die, a combined work supporting and stripping means, and pressure applying means, said combined means being mounted on said pressure applying means for movement therewith toward and from the dies whereby to ornament a work piece on said combined means and thereafter strip the work piece from the cutting die, and means to secure said dies against movement relative to said die support, when the work piece is stripped from the cutting die.

3. A machine for ornamenting shoe parts comprising a die support, a marking die and a cutting die, means to apply ink to said marking die, a combined work supporting and stripper plate associated with the dies, said combined plate being mounted independently of and separate from said dies, means to effect a relative movement between said dies and said plate whereby to ornament a work piece on said plate and thereafter strip the work piece from the cutting die, and means to secure said dies against movement relative to said die support, when the work piece is stripped from the cutting die.

4. A machine for ornamenting shoe parts comprising a die support, a marking die and a cutting die, means to apply ink to said marking die, a combined work supporting and stripper plate associated with the dies, work gauging means on said plate, said combined plate being mounted independently of and separate from said dies, means to effect a relative movement between said dies and said plate whereby to ornament a work piece on said plate and thereafter strip the work piece from the cutting die, and means to secure said dies against movement relative to said die support, when the work piece is stripped from the cutting die.

5. A machine for ornamenting shoe parts comprising a die support, a marking die and a cutting die, means to apply ink to said marking die, a work support, means mounting said work support for both lateral and vertical movements, means to properly position a work piece on said support, means to actuate said support into ornamenting relation with the dies, means to restrain said actuating means until said support is accurately alined with said dies, and means to secure said dies against movement relative to said die support until released therefrom by an operator.

6. A machine for ornamenting shoe parts comprising a die support, a marking die and a cutting die, means to apply ink to said marking die, pressure applying means, a work support carried thereby for substantially vertical movement therewith, means mounting said work support for lateral movement relative to said dies to facilitate placement of work on the support, means to properly position a piece of work on said support, means to actuate said pressure applying means and support through its substantially vertical path of movement into ornamenting relation to the dies, means to restrain said actuating means until said support is accurately alined with said die, and means to secure said dies against movement relative to said die support, when the work piece is stripped from the cutting die.

7. A machine for ornamenting shoe parts comprising a die support, a marking die and a cutting die, means to apply ink to said marking die, a work support, means mounting said work support for lateral movement relative to said dies to facilitate placement of work on the support, and for substantially vertical movement relative to the dies, means to properly position a piece of work on said support, means to reciprocate said support through its substantially vertical path of movement into ornamenting relation to the dies, and thereafter away from the dies to strip the work from the cutting die, and means to secure said dies against movement relative to said die support, when the work piece is stripped from the cutting die.

8. A machine for ornamenting shoe parts comprising a marking die, and a cutting die, means to apply ink to said marking die, a combined work support and stripper therefor, means to properly position a piece of work on said support, means to effect a relative movement between said support and said dies into ornamenting relation to the work, and positive acting means mounting said work support for direct movement effective to strip the work from the cutting die after an ornamenting operation.

9. A machine for ornamenting shoe parts comprising a marking die, and a cutting die, means to apply ink to said marking die, a combined work support and stripper therefor, means to properly position a piece of work on said support, and means to move said work support into ornamenting relation to the dies and thereafter withdraw said support to strip the work from the cutting die, said last means including a non-resilient, positive acting means effective to produce a direct stripping movement.

10. A machine for ornamenting shoe parts comprising a marking die, and a cutting die, means to apply ink to said marking die, a combined work support and a stripper therefor, means to properly position a piece of work on said support, means to effect a relative movement between said support and dies through one plane to facilitate placement of work on said support, and means to effect a relative movement between said support and dies through a different plane into ornamenting relation to the work, and thereafter through the latter plane to strip the work from the cutting die, said last means including a non-resilient, positive acting means effective to produce a direct stripping movement.

11. A machine for ornamenting shoe parts comprising a marking die, and a cutting die, means to apply ink to said marking die, a combined work support and stripper therefor, means to properly position a piece of work on said support, means to effect a relative movement between said support and said dies into ornamenting relation to the work, positive acting means mounting said work support for direct movement effective to strip the work from the cutting die after an ornamenting operation, and means controlled by said support to restrain said movement effecting means until the support is accurately alined relative to said dies.

12. A machine for ornamenting shoe parts comprising a movable work support, means to properly position a piece of work on said support, a marking die, and a cutting die, means to apply ink to said marking die, pressure applying means to move said support to and from the dies, said work support being mounted on said pressure applying means for movement therewith and for movement relative thereto.

13. A machine for ornamenting shoe parts comprising a movable work support, means to properly position a piece of work on said support, a marking die, and a cutting die, means to apply ink to said marking die, pressure applying means to move said support to and from the dies, said work support being mounted on said pressure applying means for movement therewith and for both lateral and axial movement relative thereto.

14. A machine for ornamenting shoe parts comprising a movable work support, means to properly position a piece of work on said support, a marking die, and a cutting die, means to apply ink to said marking die, pressure applying means to move said support to and from the dies, said work support being mounted on said pressure applying means for movement therewith and for both lateral and axial movement relative thereto, and means to restrain said pressure applying means for operation until said work support is accurately positioned with respect to said dies for an ornamenting operation.

15. A machine for ornamenting shoe parts comprising a frame, a marking die and a cutting die mounted in said frame, means to apply ink to said marking die, pressure applying means mounted in said frame for movement toward and from said dies, work supporting means interposed between said pressure applying means and said dies, said work supporting means being mounted for movement with and relative to said pressure applying means into ornamenting relation to said dies, and thereafter away from the dies to strip the work from the cutting die, and positive acting means effective to produce a direct stripping movement.

16. A machine for ornamenting shoe parts comprising a frame, a marking die and a cutting die mounted in the base thereof, means to apply ink to said marking die, a pressure applying means mounted above said dies for movement toward and from said dies, work supporting means carried by said pressure applying means, and effective to support a piece of work adjacent said pressure applying means, said work supporting means being constructed to permit passage of the dies therethrough into engagement with the work thereon, whereby the work may be ornamented, and thereafter stripped from the cutting die.

17. A machine for ornamenting shoe parts comprising a marking die, and a cutting die, means to apply ink to said marking die, a combined work support and stripper therefor spaced from and independent of said dies, means to properly position a piece of work on said support, pressure applying means to move said support to and from the dies, said work support being mounted on said pressure applying means for movement therewith and for movement relative thereto.

18. A machine for ornamenting shoe parts comprising a movable work support, means to properly position the piece of work on said support, a marking die and a cutting die, means mounted on said support to apply ink to said marking die, pressure applying means to move said support to and from the dies, said work support being mounted on said pressure applying means for movement therewith and for movement relative thereto into ornamenting relation to the dies and thereafter away from the dies to strip the work from the cutting die.

19. A machine for ornamenting shoe parts comprising a movable work support, means to properly position a piece of work on said support, a marking die and a cutting die, means mounted on said support to apply ink to said marking die, pressure applying means to move said support to and from the dies, said work support being mounted on said pressure applying means for both lateral and axial movement relative thereto and for movement therewith whereby to ink the marking die, ornament the work, and thereafter strip the work from the cutting die.

20. A machine for ornamenting shoe parts comprising a die support, a marking die and a cutting die, means to apply ink to said marking die, a combined work supporting and stripping means, and pressure applying means, said combined means being mounted on said pressure applying means for movement therewith toward and from the dies whereby to ornament a work piece on said combined means and thereafter strip the work piece from the cutting die, means to secure said dies against movement relative to said die support, when the work piece is stripped from the cutting die, and means comprising a chip cavity in said cutting die to receive cuttings from the work.

21. In an ornamenting machine, the combination with a cutting block and an ornamenting means having relative fixed positions laterally, of a combined supporting means for the work and work-stripping means for the ornamenting means mounted for periodic movement endwise into and out of position between the cutting block and the ornamenting means, means to produce relative movement between said block and ornamenting means to ornament the work, and relative movement in the opposite direction to strip the work from the ornamenting means, and positive acting means to restrain said ornamenting means against movement in the direction of stripping, during the work stripping operation.

22. In an ornamenting machine, the combination with a cutting block and an ornamenting means having relative fixed positions laterally, of a combined supporting means for the work and work-stripping means for the ornamenting means movable manually and automatically in two directions normal to each other, respectively, to interpose it between the cutting block and the ornamenting means and to strip the work from the ornamenting means, respectively, and positive acting means to restrain said ornamenting means against movement in the direction of stripping, during the stripping operation.

23. In an ornamenting machine, the combination with ornamenting means having upstanding ornamenting edges and a work support, having at least one aperture, yieldingly supported at a higher level than said edges and movable at that level periodically relatively to the ornamenting edges to register the aperture directly over said edges, means for drum-heading the work across the aperture and for depressing the work support to engage the drum-headed portion of the work with the ornamenting edges, and for restoring said support to its original position, and positive acting means to restrain said ornamenting means against movement with said support when said support is restored to its original position.

24. In a perforating machine, the combination with a bed, and a perforating die secured in a fixed position to the bed, of a work-stripping plate for the die movable endwise into and out of working-stripping relation thereto, and positive acting means to restrain said perforating die against movement in the direction of stripping, during a stripping operation.

25. In a perforating machine, the combination with a bed and a perforating die secured in a fixed position to the bed, of a combined work-supporting and stripping plate for the die movable endwise into and out of work-stripping relation thereto, and positive acting means to restrain said perforating die against movement in the direction of stripping, during a stripping operation.

26. In an ornamenting machine, the combination with a work support, and ornamenting means including a marking plate having at least one marking die thereon, of spring means acting on the marking plate, and means acting on the work support, respectively, in a direction to cause each of them to exert a stripping pressure on the work, and positive acting means to restrain said ornamenting means against movement in the direction of stripping, during a stripping operation.

27. In an ornamenting machine, the combination with a work support and ornamenting means, including a marking plate having at least one marking die thereon, of positive acting means and spring means, the latter acting on the marking plate and the former acting on the work support, in a direction to cause each of them to exert a stripping pressure on the work, and positive acting means to restrain said ornamenting means against movement in the direction of stripping, during a stripping operation.

28. In an ornamenting machine, the combination with a work support and ornamenting means, including a marking plate having at least one marking die thereon, of positive acting mechanical means and spring means, the latter acting on the marking plate, and the former acting on the work support in a direction to cause each of them to exert a stripping pressure on the work.

29. In an ornamenting machine, the combination with ornamenting means including a marking plate having at least one marking die thereon, of spring means acting on the marking plate and means acting independently thereof, respectively, for exerting a stripping pressure on the work, and positive acting means to restrain said ornamenting means against movement in the direction of stripping, during a stripping operation.

30. In an ornamenting machine, the combination with ornamenting means including a marking plate having at least one marking die thereon, of spring means acting on the marking plate and positive acting mechanical means functioning independently thereof, respectively, for exerting a stripping pressure on the work.

31. A machine for ornamenting shoe parts comprising a fixed bed, a die, means to secure said die against movement from the face of said bed, a work support above said die mounted for movement in one direction relative to said die to ornament a work piece carried by the support, and for movement in the opposite direction relative to said die to strip the work from the die, and means to move said work support.

32. A machine for ornamenting shoe parts comprising a fixed bed, a die, means to secure said die against movement from the face of said bed, a work support above said die mounted for movement in one direction relative to said die to ornament a work piece carried by the support, and for movement in the opposite direction relative to said die to strip the work from the die, and means to move said work support, including a plunger effective to apply said work piece and work support under pressure to the die.

33. A machine for ornamenting shoe parts comprising a fixed bed, a die, means to secure said die against movement from the face of said bed, a work support above said die mounted for movement in one direction relative to said die to ornament a work piece carried by the support, and for movement in the opposite direction relative to said die to strip the work from the die, and means to move said work support, including a plunger effective to apply said work piece and work support under pressure to the die, said work support being carried by said plunger.

34. A machine for ornamenting shoe parts comprising a fixed bed, a die, means to secure said die against movement from the face of said bed, work stripping means independent of said die for removing work from said die after an ornamenting operation, and means independent of said die for actuating said stripping means.

35. A machine for ornamenting shoe parts comprising a fixed bed, a die, means to secure said die against movement from the face of said bed, a plunger for applying a work piece to said die under pressure during an ornamenting operation, work stripping means independent of said die for removing work from said die after an ornamenting operation, and positive acting means including said plunger for actuating said stripping means.

36. A machine for ornamenting shoe parts comprising a fixed bed, a die, means to secure said die against movement from the face of said bed, a plunger for applying a work piece to said die under pressure during an ornamenting operation, work stripping means carried by said plunger independently of said die for removing work from said die after an ornamenting operation, said plunger being effective to positively actuate said stripping means during a stripping operation.

37. In a perforating machine, the combination with a bed and a perforating die secured in a fixed position to the bed, of a combined work supporting and stripping plate for the die movable endwise into and out of work ornamenting and work stripping relation thereto, means to lock said plate in accurate alignment with said die, and positive acting means to restrain said perforating die against movement in the direction of stripping during a stripping operation.

38. A machine for ornamenting shoe parts comprising a die support, a marking die and a cutting die, means to apply ink to said marking die, a combined work gauging, work supporting, and work stripping plate for the die, said plate being mounted in said machine for both lateral and axial movement relative to said die, means to align said plate relative to said die, means to effect relative movements of said plate and die towards each other during an ornamenting operation and away from each other during a stripping operation, and means to secure said die against movement from its support during the stripping operation.

39. A machine for ornamenting shoe parts comprising a die support, a marking die and a cutting die, means to apply ink to said marking die, a combined work gauging, work supporting, and work stripping plate for the die, said plate being mounted in said machine for both lateral and axial movement relative to said die, means to align said plate relative to said die and to secure the plate in its aligned position, means to effect relative movements of said plate and die towards each other during an ornamenting operation and away from each other during a stripping operation, and means to secure said die against movement from its support during the stripping operation.

40. A machine for ornamenting shoe parts comprising a die support, a marking die and a cutting die, means to apply ink to said marking die, a combined work gauging, work supporting, and work stripping plate for the die, pressure applying means on the opposite side of said plate from said die, said plate being mounted for both lateral and axial movement relative to said die, into and out of position interposed between the die and pressure applying means, said plate having openings for passage of ornamenting portions of the die therethrough into contact with work supported on the opposite side thereof, means to effect relative movement between said pressure applying means and said die, thereby to move said plate into juxtaposition with said die during an ornamenting operation, and to position spaced from the die during a stripping operation, and means to secure said die against movement from its support during the stripping operation.

41. A machine for ornamenting shoe parts comprising a bed, a perforating die mounted on said bed, a combined work supporting, work gauging and work stripping plate movable endwise into and out of work stripping relation to the die, and positive acting means to restrain said perforating die against movement in the direction of stripping during the stripping operation.

42. A machine for ornamenting shoe parts comprising a bed, a perforating die mounted on said bed, a combined work supporting, work gauging and work stripping plate movable axially relative to the die into and out of work ornamenting and work stripping relation thereto, said plate being perforated to permit passage of die elements therethrough into engagement with work supported on the opposite side of the plate from said die, and positive acting means to restrain said perforating die against movement in the direction of stripping during the stripping operation.

43. In an ornamenting machine, the combination with a cutting block and an ornamenting means having relatively fixed positions laterally, of a combined work gauging, work supporting, and work stripping means interposed between said block and ornamenting means, said block and ornamenting means being relatively movable to and from each other for ornamenting and stripping operations respectively, and means to hold said ornamenting means against movement in the direction of stripping during a stripping operation.

44. In an ornamenting machine, the combination with a cutting block and an ornamenting means having relatively fixed positions laterally, of a combined work gauging, work supporting, and work stripping means interposed between said block and ornamenting means, said block and ornamenting means being relatively movable to and from each other for ornamenting and stripping operations respectively, said work supporting means being perforated to permit passage of the ornamenting means therethrough during an ornamenting operation, and means to hold said ornamenting means against movement in the direction of stripping during a stripping operation.

45. An ornamenting machine comprising a bed, a guideway thereon, ornamenting means including a marking die, said means having a portion cooperative with said guideway to facilitate sliding the die to its operative position, a perforated work support movably mounted in spaced relation thereto, ink applying means positioned for operation in a plane between said work support and said marking die, and at the opposite side of said work support from any work supported thereon, means to effect a relative movement between said die and said ink applying means whereby to ink the die, and means to effect relative movement between said work support and said die to effect an ornamenting operation, through the work support and thereafter to strip the work from the die.

46. An ornamenting machine comprising a bed, a guideway thereon, ornamenting means including a marking die, said means having a portion cooperative with said guideway to facilitate sliding the die to its operative position, a perforated work support movably mounted in spaced relation thereto, ink applying means positioned for operation in a plane between said work support and said marking die, and at the opposite side of said work support from any work supported thereon, means to effect a relative movement between said die and said ink applying means whereby to ink the die, means to effect relative movement between said work support and said die to effect an ornamenting operation, through the work support and thereafter to strip the work from the die, means operable against the marking die, and additional means independent thereof operable against the work support respectively in a direction to cause each of them to exert a stripping pressure on the work.

47. A machine for ornamenting shoe parts comprising a bed having a guideway thereon, a die, means on said die cooperative with said guideway to facilitate sliding said die on said bed, a perforated work support above said die mounted for movement in one direction relative to said die to ornament a workpiece through the perforation of the support, and for movement in the opposite direction relative to said die to strip the work from the die, said work support and die being normally positioned in spaced relation to each other, and means to interpose an ink applying member between said work support and die, beneath the work, thereby to ink the die.

48. A machine for ornamenting shoe parts comprising a bed having a guideway thereon, a die, means on said die cooperative with said guideway to facilitate sliding said die on said bed, a perforated work support above said die mounted for movement in one direction relative to said die to ornament a workpiece through the perforation of the support, and for movement in the opposite direction relative to said die to strip the work from the die, said work support and die being normally positioned in spaced relation to each other, and means to interpose an ink applying member between said work support and die, beneath the work, thereby to ink the die, said work support and ink applying member being so positioned relative to each other as to necessitate movement of the support to an inoperative position when ink is applied.

49. A machine for ornamenting shoe parts comprising a bed having a guideway thereon, a die, means on said die cooperative with said guideway to facilitate sliding said die on said bed, a perforated work support above said die mounted for movement in one direction relative to said die to ornament a workpiece through the perforation of the support, and for movement in the opposite direction relative to said die to strip the work from the die, said work support and die being normally positioned in spaced relation to each other, means to interpose an ink applying member between said work support and die, beneath the work, thereby to ink the die, means to move said work support laterally to an inoperative position when ink is applied, and means to move said work support through its ornamenting and stripping operations.

50. A machine for ornamenting shoe parts comprising a bed having a guideway thereon, a die, means on said die cooperative with said guideway to facilitate sliding said die on said bed, a perforated work support above said die mounted for movement in one direction relative to said die to ornament a workpiece through the perforation of the support, and for movement in the opposite direction relative to said die to strip the work from the die, said work support and die being normally positioned in spaced relation to each other, means to interpose an ink applying member between said work support and die, beneath the work, thereby to ink the die, means to move said work support laterally to an inoperative position when ink is applied, and means to move said work support through its ornamenting and stripping operations, including a plunger effective to apply said die, and said workpiece and work support to each other under pressure.

51. A machine for ornamenting shoe parts comprising a fixed bed, a die having cutting edges and an ornamenting plate for marking the work in predetermined relation to said cutting edges, said ornamenting plate being supported in a plane advanced with respect to said cutting edges, means to secure said die against movement from the face of said bed, a work support above said die mounted for movement in one direction relative to said die to ornament a work piece carried by the support, and for movement in the opposite direction relative to said die to strip the work from the die, and means to move said work support.

BENJAMIN W. FREEMAN.

CERTIFICATE OF CORRECTION.

Patent No. 2,140,697. December 20, 1938.

BENJAMIN W. FREEMAN.

It is hereby certified that error appears in the printed specification of the above numbered patent requiring correction as follows: Page 5, second column, line 35, claim 14, for the word "for" read from; page 6, second column, line 17, claim 24, for "working-stripping" read work-stripping; and that the said Letters Patent should be read with this correction therein that the same may conform to the record of the case in the Patent Office.

Signed and sealed this 31st day of January, A.D. 1939.

Henry Van Arsdale (Seal) Acting Commissioner of Patents.